(12) United States Patent
Ezumi et al.

(10) Patent No.: US 6,502,739 B2
(45) Date of Patent: Jan. 7, 2003

(54) METHOD OF MANUFACTURE OF A STRUCTURAL BODY

(75) Inventors: Masakuni Ezumi, Kudamatsu (JP); Kazusige Fukuyori, Kudamatsu (JP); Akihiro Satou, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 76 days.

(21) Appl. No.: 09/835,778

(22) Filed: Apr. 12, 2001

(65) Prior Publication Data

US 2002/0030082 A1 Mar. 14, 2002

Related U.S. Application Data

(62) Division of application No. 09/572,985, filed on May 17, 2000, now Pat. No. 6,273,323.

(30) Foreign Application Priority Data

| May 31, 1999 | (JP) | 11-151129 |
| May 31, 1999 | (JP) | 11-151130 |
| May 31, 1999 | (JP) | 11-151131 |

(51) Int. Cl.[7] .......................... B23K 20/12; B23K 31/02
(52) U.S. Cl. ................. 228/112.1; 228/114.5; 228/227; 228/184
(58) Field of Search .................... 228/112.1, 114.5, 228/182, 184, 203, 164, 228, 227; 156/73.5

(56) References Cited

U.S. PATENT DOCUMENTS

| 5,460,317 A | 10/1995 | Thomas |
| 5,603,448 A | 2/1997 | Woerner |
| 5,697,511 A | 12/1997 | Bampton |
| 5,718,366 A | 2/1998 | Colligan |
| 5,813,592 A | 9/1998 | Midling et al. |
| 6,045,028 A | 4/2000 | Martin et al. |
| 6,050,474 A | 4/2000 | Aota |
| 6,051,325 A | 4/2000 | Talwar |
| 6,105,902 A | 8/2000 | Pettit |
| 6,168,067 B1 | 1/2001 | Waldron |

FOREIGN PATENT DOCUMENTS

| DE | 19524776 | 9/1997 |
| EP | 579500 | 1/1994 |
| EP | 797043 | 9/1997 |
| JP | 10193140 | 7/1980 |
| JP | 1052773 | 2/1988 |
| JP | 11047858 | 2/1999 |
| JP | 11179568 | 7/1999 |

*Primary Examiner*—Tom Dunn
*Assistant Examiner*—Colleen P. Cooke
(74) *Attorney, Agent, or Firm*—Antonelli, Terry, Stout & Kraus, LLP

(57) ABSTRACT

The rotary tools are disposed to weld along two spaced welding lines. The two rotary tools are inserted into respective welding joints and moved at the same time along the respective welding lines. At a position P1 of a portion of a window one rotary tool is withdrawn from the welding joint so that the friction stir welding on that welding joint is stopped although the welding tool continues to move. At a position P3, the rotary tools are gradually withdrawn from their respective welding joints while they continue to move along the welding line. At a position P4, the movement of the rotary tools along the respective welding lines is stopped, the rotary tools are completely withdrawn and the welding is stopped. Next, the rotary tools are inserted into the respective welding joints once again and movement thereof is started again. An insertion amount of the rotary tools at this time is larger than the insertion amount thereof prior to the stopping of the movement of these rotary tools.

3 Claims, 6 Drawing Sheets

METHOD OF MANUFACTURE OF A STRUCTURAL BODY

This is a divisional application of U.S. Ser. No. 09/572,985, filed May 17, 2000 now U.S. Pat. No. 6,273,323.

BACKGROUND OF THE INVENTION

The present invention relates to a method of manufacturing a structural body using a friction stir welding method; and, for example, the invention relates to a manufacturing method suitable for the manufacture of a car body of a railway vehicle Friction stir welding is a method wherein a round rod (called a "rotary tool"), which is inserted into a welding joint, is rotated and moved along the welding joint so that the welding joint is heated, softened and solid-fluidized, whereby a solid phase welding occurs.

The rotary tool comprises a small diameter portion which is inserted into the welding joint, and a large diameter portion which is positioned outside of the small diameter portion. The small diameter portion and the large diameter portion of the rotary tool have the same axis of rotation. A boundary between the small diameter portion and the large diameter portion of the rotary tool is inserted slightly into the welding joint. The rotary tool is inclined toward the rear relative to the advancing direction of the welding.

A car body of a railway vehicle is constituted by carrying out a friction stir welding of plural extruded frame members. The longitudinal direction of the extruded frame member is directed in the longitudinal direction of the car body, and the width of the extruded frame member is arranged in the direction of the height of the car body. To a side face of the car body with the above-stated construction, an opening, such as a door or window, is typically provided by cutting-out a portion of the extruded members.

The above-stated technique is disclosed in Japanese application patent laid-open publication No. 09-309164 (EP 0797043A2).

Since the height of a window of a car body is typically larger than the width of an extruded frame member, the window is formed by an opening cut into two or three frame members. For this reason, the extruded frame members in which a cut-off portion is provided are substantially aligned to form the window and then joined by welding. A friction stir welding apparatus for manufacturing a car body comprises a bed for mounting plural extruded frame members and a gantry disposed over the bed and from which plural rotary tools are suspended. By controlled movement of the gantry, the plural rotary tools are moved so that plural extruded frame members can be welded simultaneously.

In a case where the plural extruded frame members are welded simultaneously using plural rotary tools which are suspended from a gantry, when a first rotary tool reaches a position where a window is located, this rotary tool is withdrawn from the extruded frame member, and the friction stir welding being performed by this rotary tool is stopped. Meanwhile, a second rotary tool for welding a portion where a window does not exist is allowed to continue the friction stir welding as it is. When the first rotary tool is moved to a position at the other end of the window, this first rotary tool is inserted once again into the weld joint and the friction stir welding is resumed.

When this process is carried out, by removing the first rotary tool from the welding joint at one side of the window and then re-inserting into the welding joint at the other side of the window, a defect in the welding can be generated easily. Further, at an initial time during the start of the friction stir welding since the temperature of the welding joint has not yet been raised, a large insertion force is required for inserting the rotary tool into the welding joint.

In addition to the above, since the rotary tool is moved while it is inserted into the welding joint, a slant force is generated against a bearing member of the rotary tool. For this reason, the bearing member is required to be large in size, and a problem with the life expectancy of the rotary tool occurs.

SUMMARY OF THE INVENTION

A first object of the present invention is to obtain good friction stir welding in a case of welding plural lines simultaneously, while a portion of the member or members to be subjected to welding does not exist or in which friction stir welding is unnecessary, when the friction stir welding begins again after being interrupted.

A second object of the present invention is to perform friction stir welding in a short time in a case of welding plural lines simultaneously, where a portion of the member or members to be subjected to welding does not exist or in which friction stir welding is unnecessary.

The above-stated first object can be attained by a method of manufacturing a structural body comprising the steps of: starting a friction stir welding by inserting respective rotary tools into plural welding joints at a first position; stopping the friction stir welding of one welded joint by withdrawing one of the rotary tools from that welding joint, while continuing movement of the one of the rotary tools accompanying movement of the other of the rotary tools at a second position; stopping the movement of the respective rotary tools and stopping the friction stir welding while withdrawing the other of the rotary tools from its welding joint; inserting the respective rotary tools to a predetermined depth into each respective welding joint; and starting the friction stir welding by again starting the movement of the respective rotary tools along their respective welding joints.

The above-stated second object can be attained by a method of manufacturing a structural body comprising the steps of: starting friction stir welding by inserting respective rotary tools into plural welding joints at a first position; withdrawing one of the rotary tools from a welding joint, while continuing movement thereof accompanying movement of others of the rotary tools at a second position; and then inserting the one of the rotary tools into its welding joint once again.

DESCRIPTION OF THE INVENTION

Figure 1:
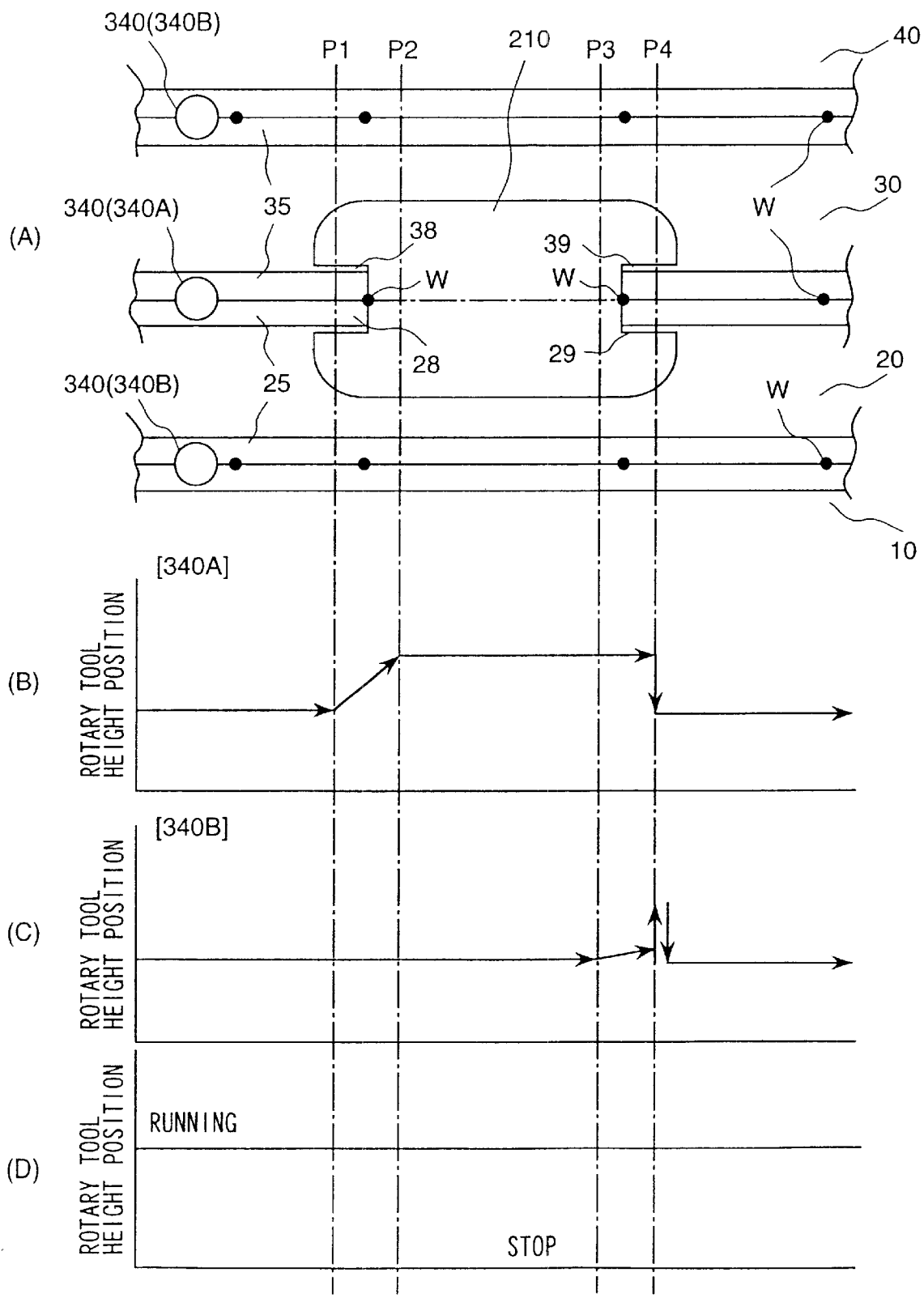
FIG. 1 is a diagram showing a method of manufacture of a structural body representing one embodiment according to the present invention.

One embodiment of a method of manufacture of a structural body according to the present invention will be explained with reference to FIG. 1 to FIG. 5. As a structural body, a railway car body will be referred to by way of example. As shown in FIG. 5, the car body comprises a side structure 201 for constituting a side face of the car, a roof structure 202 for constituting a roof of the car, a bogie frame 203 for constituting a floor of the car, and an end structure 204 for constituting an end of the car body.

The side structure 201, the roof structure 202, and the bogie frame 203 are constituted respectively by joining plural extruded frame members. The longitudinal direction of each of the extruded frame member is directed in the longitudinal direction of the car body. The material of the extruded frame member is an aluminum alloy.

As shown in FIG. 5, the side structure 201 comprises extruded frame members 10, 20, 30 and 40. In the extruded frame members 20 and 30, a window opening 210 is provided by cutting away parts of the frame members 20, 30. An inlet and outlet port (doorway) 220 of the side structure 201 is provided by cutting away parts of the extruded frame members 10, 20, 30 and 40. As to the inlet and outlet port 220, after the extruded frame members 10, 20, 30 and 40 have been joined, in many cases a frame is welded in position. The window 210 is formed in a similar way. The extruded frame members 10, 20 and 30 of the inlet and outlet port 220 are cut off at a respective midway portion.

This side structure 201 is comprised of the four extruded frame members 10,20, 30 and 40, however, in a case of a hollow extruded frame member, the side structure 201 may be constituted by many more extruded frame members. Further, it is possible for the window 210 to be constituted by three extruded frame members. In this case, a central extruded frame member is cut off at a midway portion.

Figure 3:
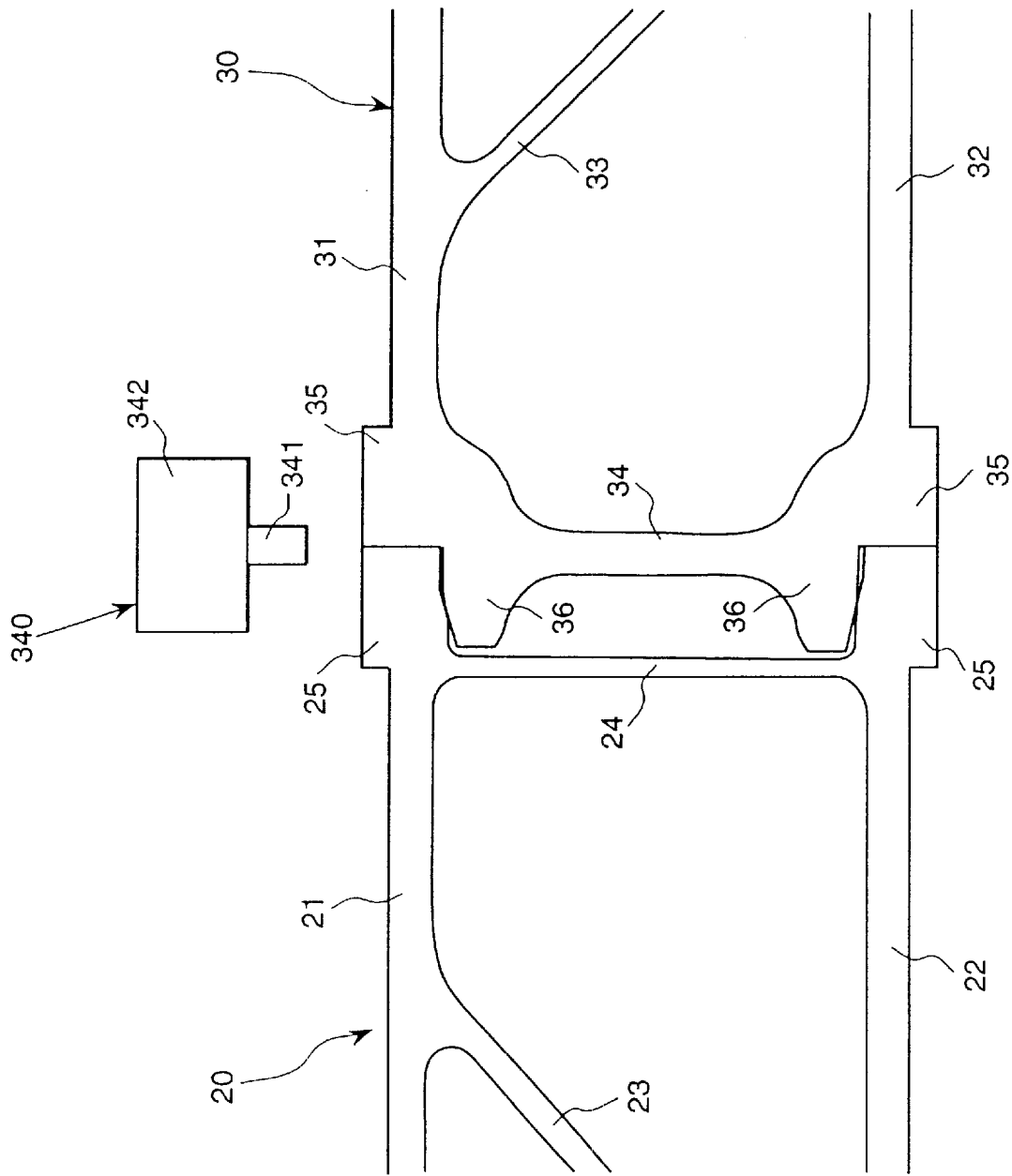
FIG. 3 is a longitudinal cross-sectional view showing a structural body according to the present invention.

The construction of the extruded frame members used to form the side structure 201 will be explained with reference to FIG. 3. Herein, the joining of the extruded frame members 20 and 30 will be explained. The other frame members 10 and 40 are similar in configuration to these extruded frame members 20 and 30. The extruded frame members 20 and 30 are hollow frame members.

The hollow frame member 20 comprises two face plates 21 and 22, plural ribs 23 arranged in a truss shape for connecting the face plates 21 and 22, and a supporting plate 24 for connecting the two face plates 21 and 22 in an end portion (a joining portion) in a width direction of the hollow frame member 20. The hollow frame member 30 comprises two face plate 31 and 32, plural ribs 33 arranged in a truss shape for connecting the face plates 31 and 32, and a supporting plate 34 for connecting the two face plates 31 and 32 in an end portion (a joining portion) in a width direction of the hollow frame member 30.

In the width direction of the end portion (the joining portion) of the face plates 21 and 22, a raised portion 25 projecting toward the outside of the respective face plate is provided. In the width direction of the end portion (the joining portion) of the face plates 31 and 32, a raised portion 35 projecting toward then outside of the respective face plate is provided. At the end portion in the width direction of the hollow frame member 30, a pair of projection chips 36 projecting toward the opposite hollow end of the frame member 20 are provided. The projection chips 36 are located between the face plates 21 and 22 at the end portion of the face plates 21 and 22 of the hollow frame member 20 so as to form a seat for supporting the insertion force of a rotary tool 340.

The width of the two raised portion 25 are the same, and an end face of the raised portion 35 which bears against the raised portion 25 is arranged to extend substantially along the center of the plate thickness of the supporting plate 34. At a center of the surface formed by the two raised portions 25 and 35, i.e., where the welding joint is located, the rotation axial center of the rotary tool 340 of the friction stir joining apparatus 330 is positioned.

Figure 4:
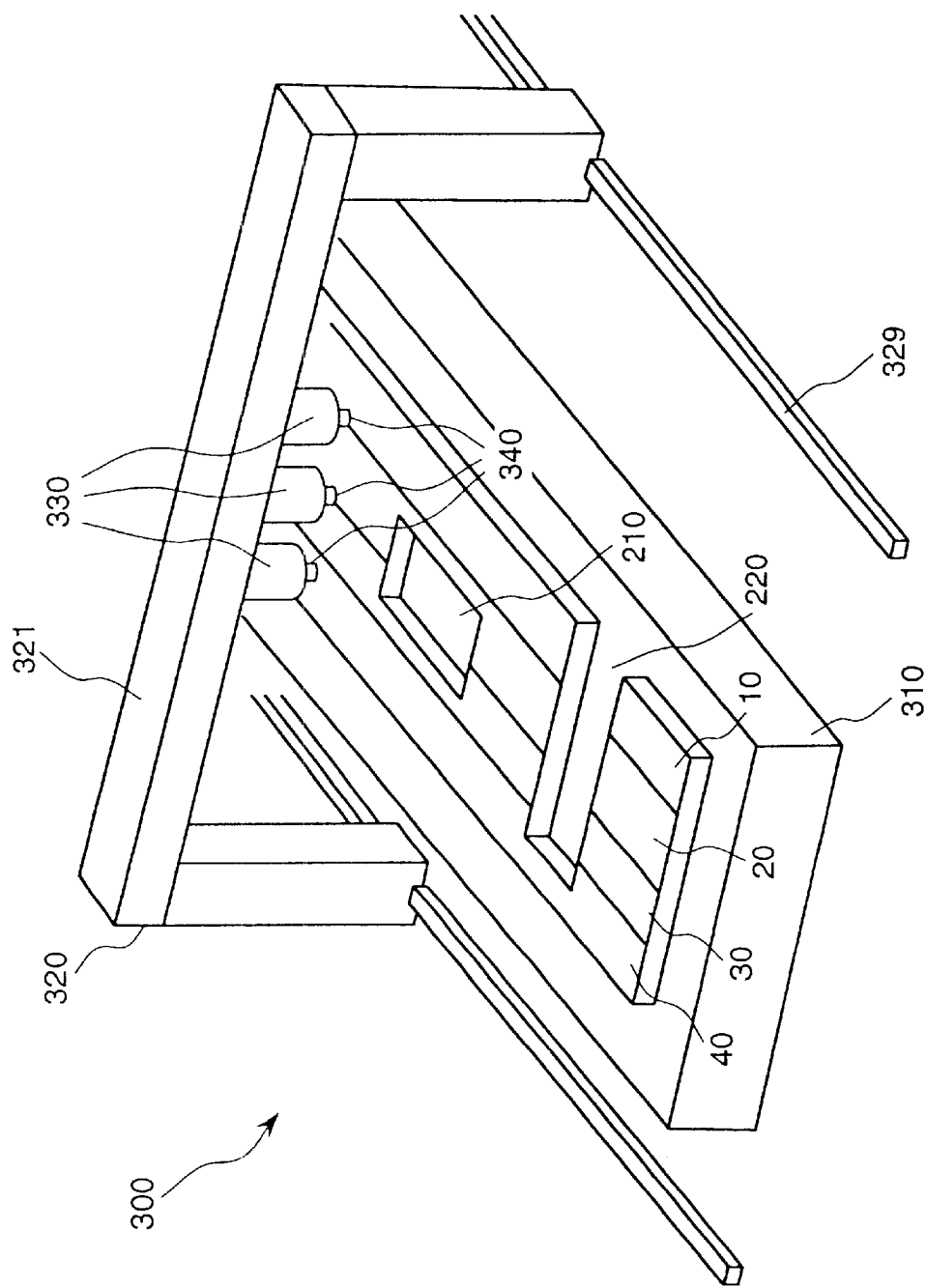
FIG. 4 is a perspective view showing a friction stir welding apparatus for manufacturing a structural body according to the present invention.
Figure 5:
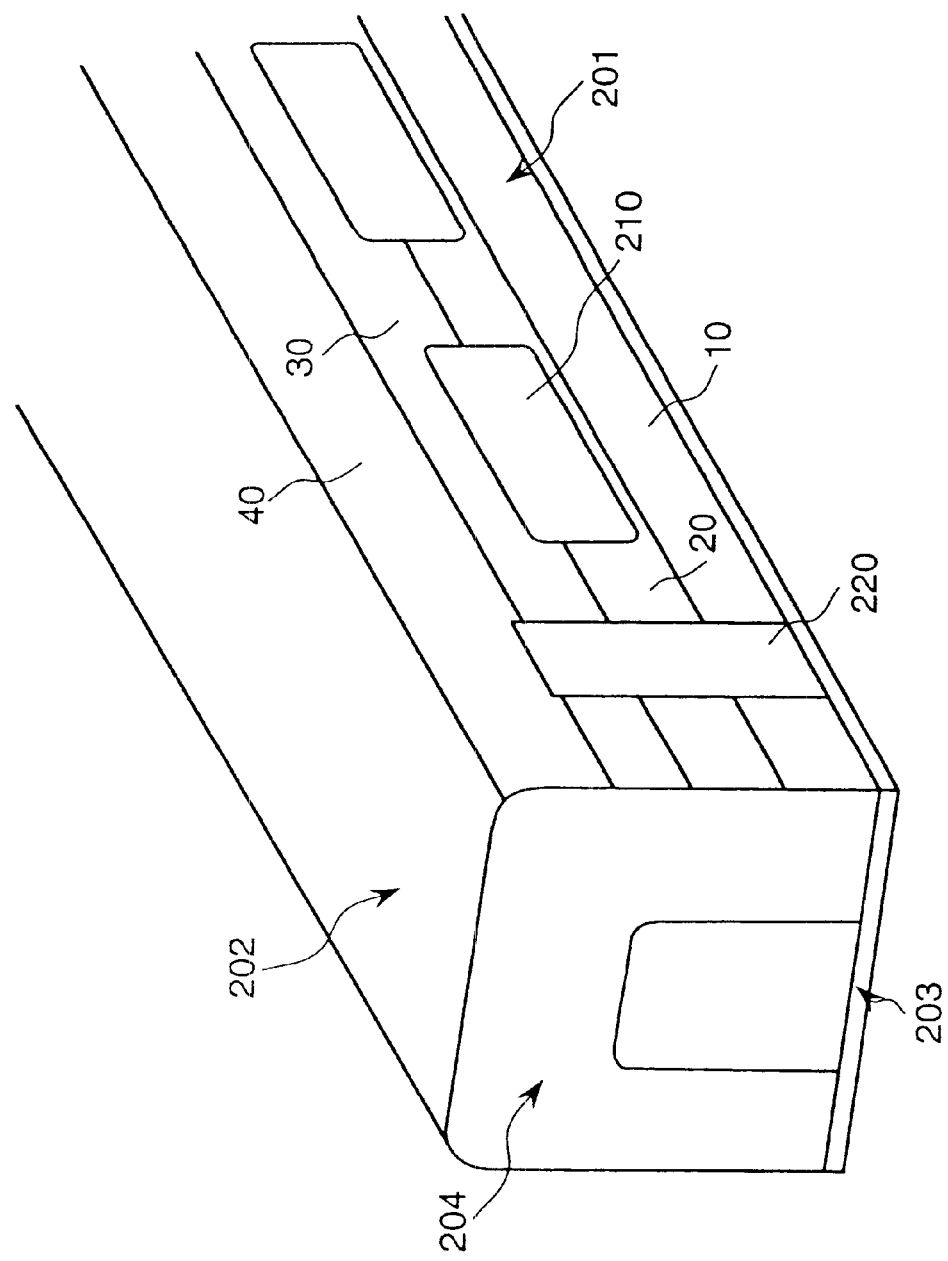
FIG. 5 is a perspective view showing a car body of a railway vehicle according to the present invention.

As seen in FIG. 4, the extruded frame members 10, 20, 30 and 40 constituting the side structure 201 are mounted on a bed 310 of the friction stir welding equipment 300 and are fixed to the bed 310 by suitable means. Above the plural extruded frame members 10, 20, 30 and 40 a gantry 320 runs on rails 329 located on both sides of the bed 310. From a girder 321 of the gantry 320, three friction stir welding apparatuses 330 are suspended.

The friction stir welding apparatuses 330 operate to raise and lower the rotary tools 340 for welding the frame members positioned on the bed 310. The bed may be arc shaped. The respective friction stir welding apparatuses 330 can be independently moved along the girder 321 to a welding position, at which the rotary tools 340 can be independently raised and lowered while rotating to effect selective welding.

The respective friction stir welding apparatuses 330 are provided with an optical sensor which detects the distance from the apexes of the raised portions 25 and 35 and sets an insertion amount of the rotary tool 340 at a predetermined value. Further, the optical sensors detect width of the surface formed by the raised portions 25 and 35 and determines a center thereof to position the axial center of the rotary tool 340 for welding.

In the extruded frame members 20 and 30 on which a window 210 is provided, an opening (a cut-off portion) having substantially a window shape is provided at the position of the window in advance. This opening is provided by cutting out a portion of the extruded frame members 20 and 30. Similarly, the extruded frame members 10, 20 and 30 in which the inlet and outlet port 220 is provided are cut off and are arranged to accommodate the interval of the inlet and outlet port 220. In the extruded frame member 40 for constituting an upper end of the inlet and outlet port 220, an opening (a cut-off portion) having a substantially inlet and outlet port shape is provided at a position of the inlet and outlet port 220 in advance. This opening is provided by cutting out a portion of the extruded frame member 40.

The formation of the window 210 will be explained. The welding joint of the extruded frame members 20 and 30 has a welding line having a start end and a finish end in the window 210. For this reason, as seen in FIG. 1, the extruded frame members 20 and 30 in a vicinity of the welding line are cut off while leaving the extending portions 28, 38 and 29, 39 which project into the window 210. The width of the respective extending portions 28, 38 and 29, 39 is set to have the same dimension as the supporting plates 24 and 34 and the raised portions 25 and 35. The formation of the inlet and outlet port 220 is carried out similarly. The extruded frame members 10, 20, 30 and 40 are cut off while leaving respective extending portions 28, 38 and 29, 39. Further, the extending members chips 28, 38 and 29, 39 are provided respectively on both ends in the longitudinal 10 direction of the side structure 201.

The hollow frame members 10, 20, 30 and 40 are mounted on and fixed to the bed 310 using a fixing means. When the hollow frame members 10, 20, 30 and 40 have been fixed, the raised portions 25 and 35 of the abutting portions of the hollow frame members 10, 20, 30 and 40 are fixed intermittently and temporarily along the welding lines by arc welding. The extreme ends of the extending portions 28, 38, 29 and 39 at the start end and the finish end of the welding line are also fixed temporarily.

A reference "W" in FIG. 1 shows where the temporary welding occurs. In particular, the temporary welding W of the start end is carried out on upper faces of the raised portions 25 and 35 and on a face of the extreme end portion in the longitudinal direction of the hollow frame members 10, 20, 30, and 40. The range of the temporary welding "W", on the face of the extreme end portion is from the upper faces of the raised portions 25 and 35 to the projection chip 36. The temporary welding "W" does not provide a V-shaped groove, but provides an I-shaped groove.

In this condition, from one end in the longitudinal direction of the hollow frame member, the friction stir welding is started. To the raised portions 25 and 35 of these chips at the starting end of the welding line, by rotating the respective rotary tools 340, a rotary tool 340 is selectively lowered and inserted into the welding joint. The insertion position is located at the finish end of the welding line on the other side of the temporary welding W location at the end portion of the chip. For example, the insertion position is a position P4 of the rotary tool 340A as shown in FIG. 1.

The chip end of the small diameter portion 341 of the rotary tool 340 is inserted into an upper face of the surface formed by raised portions 25, 35 to the depth of the projection chip 36. The position to which the lowest end of the large diameter portion 342 of the rotary tool 340 is inserted is between the plane of the outer faces of the face plates 21 and 31 (the face plates 22 and 32) and an apex of the raised portions 25 and 35. The position of the axial center of the rotary tool 340 is midway between the sides of the two raised portions 25 and 35. The axial centers of the small diameter portion 341 and the large diameter portion 342 of the rotary tool 340 are the same. The small diameter portion 341 of the rotary tool 340 is in the form of a screw member.

When the respective rotary tools 340 are inserted to a predetermined depth into the surface of the respective hollow-extruded members, the movement of the gantry 320, which carries plural friction stir welding apparatuses 330, is started to carry the welding apparatuses toward the other end, so that friction stir welding is carried out.

Figure 2:
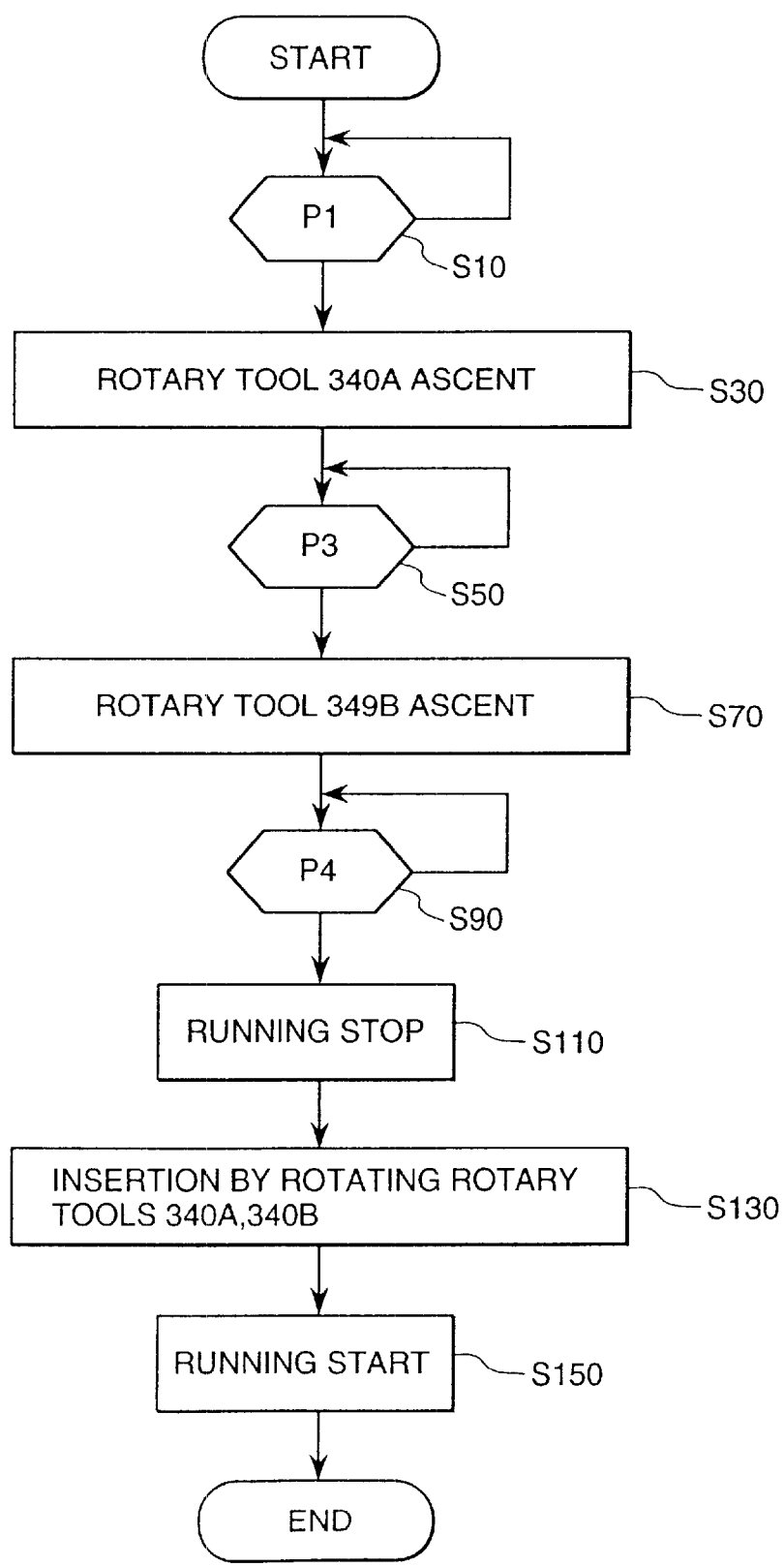
FIG. 2 is a flowchart showing a method of manufacturing a structural body according to the present invention.

Next, the operation of the friction stir welding apparatus 330 in the vicinity of the window 210 and the inlet and outlet port 220 will be explained with reference to FIG. 1 and FIG. 2. Herein, the formation of the window 210 will be considered by way of example. The rotary tool 340 which operates on the welding line intercepted by the window 210 is indicated as "340A" and the rotary tools 340 which operate on the welding lines not intercepted by the window 210 are indicated as "340B". The rotary tools 340A and 340B are inserted at the same time and move from left to the right as shown in FIG. 1.

When the friction stir welding has advanced from the end portion of the extruded frame member to a point where the rotary tools 340A and 340B reach the position P1 of the extending portions 28 and 38 at the window 210, while continuing the rotation of the rotary tool 340A, the rotary tool 340A is withdrawn from the welding joint. Namely, the rotary tool 340A is raised, but the forward movement is continued. For this purpose, the rotary tool 340A is raised gradually. The position P1 is determined by the running distance (position) of the gantry 320. The position P1 is determined in advance. (step S10 and step S30).

After the friction stir welding is completed, the extending portions 28 and 38 will be cut off in line with the edge of the window opening. For this reason, since the extending portions 28 and 38 are positioned at an upstream side of the position P1, there is no problem about the welding depth from the strength aspect of the remaining welded portion. The rotary tools 340B are not raised at the position P1 since the window 210 does not interrupt the welding lines associated therewith. The rotary tools 340B continue to move along their respective welding lines and the friction stir welding performed thereby is continued beyond the position P1.

As stated above, since the rotary tool 340A is raised while the forward movement thereof continues, without stopping the welding being carried out by the rotary tools 340A and 340B, the welding time can be shortened.

When the rotary tool 340A reaches the predetermined position (a position P2), the raising of the rotary tool 340A and the rotation thereof are stopped. At this point, the rotary tool 340A has been elevated sufficiently that it is carried at a level about the surface of the raised portions 25 and 35. When the small diameter 341 of the rotary tool 340A has been pulled entirely out (withdrawn) of the raised portions 25 and 35, the friction stir welding is stopped along the welding line.

When the rotary tools 340A and 340B reach the other end of the window 210, namely to a predetermined position P3, which is this side of the extending portions 29 and 39, a raising (withdrawal) of the rotary tools 340B starts. The speed of withdrawal of the rotary tools 340B from the respective welding joint is slow, while the movement of the gantry 320 continues. For this reason, the welding depth at which the rotary tools 340B operate become gradually more shallow. (step S50 and step S70).

When the rotary tool 340A reaches the position P4 at the extending portions 29 and 39, the movement of the gantry 320 is stopped. At this time, since the raising of the rotary tools 340B is continued, these rotary tools 340B are pulled completely out of the respective welding joints. At the position P4, the speed of withdrawal of the rotary tools 340B may be increased. The position P4 is located on the other side of the temporary welding position W. (step 90 and step 110).

The distance between the position P3 and the position P4 is, for example, 50 mm. The amount that the rotary tool 340B is withdrawn between the position P3 and the position P4 is, for example, 0.5 mm. With this amount of withdrawal, the welding depth becomes small in the remainder of the extending portions 28, 38. With this minimum welding depth, no problem occurs from the aspect of the strength of the welded portion.

When the rotary tool 340B is pulled out, in the welded portion a hole which corresponds to the diameter of the small diameter portion 341 of the rotary tool 340 is formed.

Next, at the position P4, all rotary tools 340A and 340B are made to rotate and descend, and the rotary tool 340A and the rotary tools 340B are inserted into the welding joints to a predetermined depth. The insertion amounts of the rotary tools 340A and 340B are the regular (stationary) depth. (step S130).

The rotary tools 340B are inserted into the above-stated holes. Since the insertion amount of the rotary tool 340B is the regular depth, the insertion depth is the same as it was before the position P3 (the insertion depth before the starting of the raising of the rotary tool 340B). Namely, at the position P4, the depth is the same as it was before the friction stir welding was stopped and plus 0.5 mm. With this, from the lowest end portion of the above-stated hole which was generated just before the rotary tool 340B was pulled out, the rotary tool is inserted deeply with an additional 0.5 mm.

In this condition, the movement of the gantry 320 begins to start. Using the rotary tools 340A and 340B, the friction stir welding is started again. In this way, friction stir welding to the regular depth is carried out (step S150).

As stated above, in the position P4, by inserting the rotary tools 340B into the holes which are formed prior to the pulling out of the rotary tools 340B, the friction stir welding is carried out. For this reason, the hole is buried with metal derived from the raised portions 25 and 35 as the welding proceeds. Further, since the position of the lower end of the rotary tool 340B is lower than the lowest end of the above-stated hole, and since the lower portion of the above-stated hole is joined fully, the occurrence of a defect at this portion can be restrained. In particular, since by the rotary tool 340B the lower portion at the bottom of the above-stated hole is stirred fully, a defect at the center portion of the bottom of the above stated hole can be avoided.

Further, even if a defect occurs at the central portion of the bottom of the above-stated hole, the size of the defect will not be large, and from the aspect of the strength of the weld, a full joining can be obtained.

Since the insertion position of the rotary tool 240A is located at the other side of the temporary welding position W of the end of the extending portions 29 and 39, the gap between the extending portions 29 and 39, which forms the welding joint, is not enlarged. Accordingly, a good welding can be carried out.

The next window 210 is carried out in a similar way. Also, the raising and lowering of the rotary tool 340 at the inlet and outlet port 220 is carried out in a similar way. Further, it is not necessary for all rotary tools 340 to be arranged on the same line.

As stated above, the welding is carried out to the other end, and then the structural body comprised of the plural hollow frame members is turned over on the bed 310 and the friction stir welding is carried out in a similar way. The raised portions at the outer face side of the car body are cut off and the outer face thereof is made to have the same smooth face as that of the face plate.

Further, the following processing will be carried out. In a case where a defect is not prevented with the above-stated insertion depth at the position P4, the rotary tool 340 is inserted even more deeply at this position and the welding portion is made thick. As a result, after the start of movement of the rotary tools, at the position P5 (or after a predetermined time lapses), it is possible to carry out the raising of the rotary tool 340B. Accordingly, the insertion depth becomes regular.

This ascent of the rotary tool 340B is carried out by a height position control function of the rotary tool 340. The height position control function of the rotary tool 340 is a function in which the height of the raised portions 25 and 35 is detected by the sensor, and the insertion amount from the raised portions 25 and 35 is given a predetermined value. With this, all rotary tools 340A and 340B are made to operate in a regular condition.

Further, the following processing will be carried out. Up to the position P4 the friction stir welding is carried out with the regular insertion depth, and at the position P4, the rotary tool 340B is pulled out. Next, at the position P4, the rotary tools 340A and 340B are inserted once again into the respective welding joints. The insertion depth of the rotary tool 340A is the regular amount. The insertion amount of the rotary tool 340B is larger than that of the regular amount; for example, it is plus 0.5 mm. At this time, the movement (the running) of the rotary tools 340A and 340B will start. After the of start movement, at the position P5 (or after the predetermined times lapses), the raising of the rotary tool 340B starts. The of speed withdrawal of the rotary tool 340B is slow, while the movement of the gantry 320 continues. For this reason, the welding depth of the rotary tool 340B becomes gradually more shallow.

When the rotary tool 340B is withdrawn to the predetermined position (the insertion depth before the position P4), the withdrawal of the rotary tool 340B is stopped. Accordingly, all rotary tools 340A and 340B are in a regular condition. Further, the positions P1, P2, P3 and P4 can be managed according to the time.

At the position where the rotary tool 340B are pulled out and then the rotary tools 340 can not be inserted immediately for some reason, after movement of the gantry 320 is started, at the position P4, the rotary tools 340A and 340B can be inserted into the respective welding joints.

Further, at the position P4 where the rotary tools 340B are pulled out, rather than insert the rotary tools 340B into the hole which is formed by pulling the rotary tool 340B out, it is possible to insert the rotary tool 340B at a position upstream of the position P4. In this case, the insertion amount during the second insertion of the rotary tool 340A will be the same as the insertion amount during the case in which the former welding is carried out.

Figure 6:
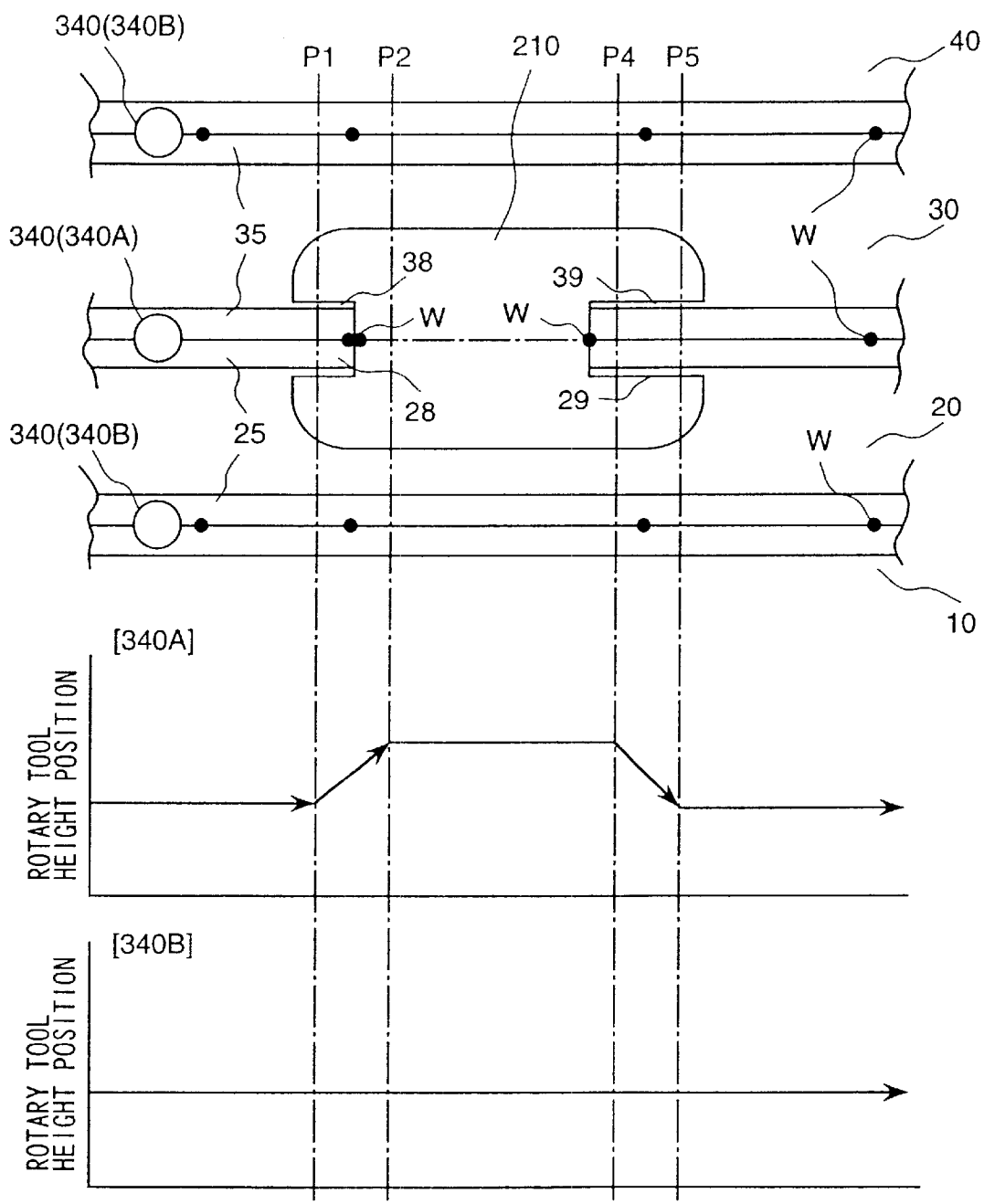
FIG. 6 is a diagram showing a method of manufacture of a structural body representing another embodiment according to the present invention.

Now, another embodiment of a method of manufacture of a structural body according to the present invention will be explained with reference to FIG. 6. When the rotary tool 340A and the rotary tool 340B reach the other end of the window 210, namely the rotary tools 340A and 340B reach the extending portions 29 and 39, the rotary tool 340A is lowered while it is rotating and then the rotary tool 340A is inserted into the welding joint to a predetermined depth. The insertion position P4, where the rotary tool 340A is inserted into the extending portions 29 and 39 is on the other side (a downstream side) of the temporary welding position W.

Since the rotary tool 340A is lowered while it is moved along the welding line, the welding depth becomes deep gradually. When the insertion amount of the rotary tool 340A reaches a predetermined amount, the lowering of the rotary tool 340A is stopped (at position P5). Accordingly, friction stir welding at a regular depth is carried out.

The position P5 where the insertion amount of the rotary tool 340A becomes regular is on the extending portions 29 and 39 before reaching the edge of the window opening. After the welding is complete, the extending portions 29 and 39 are cut off. The insertion amount of the rotary tool 340A is controlled according to the output of an optical sensor.

As stated above, since the rotary tool 340A is lowered while moving the rotary tool 340A along the welding line, without stopping the movement of either the rotary tool 340A or the rotary tools 340B, to cause the rotary tool 340A to be inserted into the welding joint between the hollow frame members 20 and 30, the time for welding can be shortened.

Since the insertion position of the rotary tool 340A is located on the other side of the temporary welding position W on the extending portions 29 and 39, and welding commences prior to the cut-off of the temporary welding portion, the gap between the extending portions 29 and 39, which forms the welding joint, is not enlarged. For this reason, a good welding can be carried out.

The gap between the two members at the insertion position (the beginning end of the welding line) of the rotary tool 340 may enlarge easily, however not only are the upper faces of the raised portions 25 and 35 temporarily welded, but also temporary welding is carried out on the end formed by the extending portions 29 and 39 in a thickness direction. Accordingly, the extruding portions 29 and 39 at the extreme end can be held together strongly. Thus, the enlargement of the beginning end of the welding line can be prevented easily.

Further, at the end portions of the hollow frame members 20 and 30, namely at the first insertion position of the rotary tools 340A and 340B, the extending portions 29 and 39 are provided, and the temporary welding portion W and the insertion position of the rotary tools 340A and 340B are formed in a manner similar to that of the former embodiment. Accordingly, in comparison with the case of temporarily welding only the upper face of the hollow frame members, the length of the chip can be shortened. Accordingly, the length of the hollow frame member can be shortened.

The technical range according to the present invention is not limited to the description of each embodiment defined in the claims items and the wordings of the description of the items for solving the problem and it can refer to the range in which the ordinary man belonged to this technical field can replace easily.

According to a first feature of the present invention, in the case where the welding of plural lines is to be carried out at the same time using friction stir welding, and where there is a portion along the welding line where the members to be subjected to the welding not exist and where friction stir welding is unnecessary, when the interrupted welding is started again, a good friction stir welding can be obtained.

According to the second feature of the present invention, in the case where the welding of plural lines is to be carried out at the same time using friction stir welding, and where a portion exists along the welding line where the members to be subjected to welding do not exist and in which friction stir welding is unnecessary, when the interrupted welding is started again, the welding can be carried out in a short time.

What is claimed is:

1. A method of manufacturing a structural body, comprising the steps of:

abutting two members;

temporarily welding a beginning end of a joining line of an abutted portion of said two members to form a welded position;

at a finishing end side of said welded position, starting the friction stir welding by inserting a rotary tool.

2. A manufacturing method according to claim 1, wherein said member is a hollow frame member, and said rotary tool is inserted at a portion of said abutted portion having a seat for supporting a face plate of an opposite part of said hollow frame member.

3. A method of manufacturing a structural body, comprising the steps of:

mounting two members on an arc shaped bed and abutting said two members against each other;

temporarily welding a beginning end of a joining line of an abutted portion of said two members to form a welded position;

at a finishing end side of said welded position, starting the friction stir welding by inserting a rotary tool.

* * * * *